United States Patent [19]
Edgeller et al.

[11] Patent Number: 6,089,650
[45] Date of Patent: Jul. 18, 2000

[54] SOUND ATTENUATING ENCLOSURE FOR A MACHINE

[75] Inventors: Peter Edgeller, Southport; Jamie Robert Wilson, Hambleton, both of United Kingdom

[73] Assignee: Ingersoll-Rand Company, Woodcliff Lake, N.J.

[21] Appl. No.: 09/253,661

[22] Filed: Feb. 22, 1999

[30] Foreign Application Priority Data

Jul. 24, 1998 [GB] United Kingdom .................... 9816273

[51] Int. Cl.[7] ....................................................... B60J 7/00
[52] U.S. Cl. ........................ 296/181; 296/39.3; 296/24.1; 296/901; 52/783.19; 180/69.22
[58] Field of Search ..................... 296/181, 168, 296/173, 24.1, 39.3, 901, 37.14, 37.1, 182; 180/69.24, 69.22, 69.23; 280/204; 52/783.19, 783.1, 789.1

[56] References Cited

U.S. PATENT DOCUMENTS

| | | |
|---|---|---|
| 1,400,890 | 12/1921 | McQuilkin . |
| 3,090,463 | 5/1963 | Yanda . |
| 3,476,209 | 11/1969 | Cohen . |
| 3,642,092 | 2/1972 | Cederbaum . |
| 3,856,439 | 12/1974 | Moehrbach . |
| 3,884,322 | 5/1975 | Nemschoff . |
| 4,347,043 | 8/1982 | Morris . |
| 4,411,121 | 10/1983 | Blacklin et al. ........................ 52/783.1 |
| 4,502,725 | 3/1985 | Wiant ....................................... 296/181 |
| 4,718,214 | 1/1988 | Waggoner ............................ 52/783.19 |
| 4,886,696 | 12/1989 | Bainbridge . |
| 4,926,963 | 5/1990 | Snyder . |
| 4,982,812 | 1/1991 | Hwang . |
| 4,982,971 | 1/1991 | Marin ......................................... 280/30 |
| 4,993,381 | 2/1991 | Absenger . |
| 5,653,494 | 8/1997 | Cleall et al. ............................ 296/182 |
| 5,791,118 | 8/1998 | Jordan .................. 52/783.11 |
| 5,804,775 | 9/1998 | Pinnington . |
| 5,863,091 | 1/1999 | Shepherd et al. ....................... 296/181 |

*Primary Examiner*—D. Glenn Dayoan
*Assistant Examiner*—Patricia Engle
*Attorney, Agent, or Firm*—Michael M. Gnibus

[57] ABSTRACT

A sound attenuating enclosure for a portable machine includes a lower body having an inner skin and an outer skin spaced apart from the inner skin. The lower body is adapted for having the portable machine mounted therein and also includes one or more wheels rotatably mounted thereto. The enclosure also has an upper body overlying the lower body for containing the portable machine between the upper and lower bodies and a towing element attached to the lower body for pulling the enclosure over a surface. One or more sections of the inner and outer skins are in permanent contact with one another for damping vibrational movement of the skins during operation of the portable machine so as to reduce the level of sound emanating from the enclosure.

18 Claims, 5 Drawing Sheets

SOUND ATTENUATING ENCLOSURE FOR A MACHINE

The present application claims benefit under 35 U.S.C. Section 119 of United Kingdom Patent Application Serial No. 9816273.8, filed Jul. 24, 1998. The present application is also related to U.S. patent application Ser. No. 09/175,268, filed Oct. 20, 1998, the disclosure of which is incorporated by reference herein. The '268 application also claimed benefit of the above-mentioned U.K. Patent Application Serial No. 9816273.8

BACKGROUND OF THE INVENTION

1. Field of the Invention

The present invention relates to devices and methods for attenuating sound and more specifically relates to a sound attenuating trailer assembly for a portable machine, such as a portable air compressor.

2. Description of the Prior Art

Noise generated by motors, engines and/or machinery is typically transmitted to the environment via structural or airborne paths. The specific level of noise transmitted by these airborne paths may be reduced by surrounding the motor, engine or machine with an enclosure. These sound reduction efforts are often made in response to federal, state and local regulations that may require machine operators to take affirmative steps to minimize the level of noise generated during operation of a machine.

There have been a number of attempts directed toward reducing the level of noise generated by a motor, engine and/or machine.

U.S. Pat. No. 3,642,092 to Cederbaum discloses a power plant with a power unit enclosed by a casing forming a sound-absorbing chamber with walls having an outlet for consumed air and an inlet for cooling air and combustion air as well as a number of labyrinth-like sound reducing passages. The labyrinth passages are arranged so that cooling air is caused to travel along the power unit and is passed through a labyrinth passage in the wall opposite the inlet, thus forming an outlet for heated air.

U.S. Pat. No. 4,347,043 to Morris discloses a compressor unit for compressing a vapor, a motor for driving the compressor, a shell encompassing the compressor and motor, and a supply of lubricant disposed within the shell. The compressor unit further includes a perforated lining positioned adjacent to the shell and annularly extending around the compressor for capturing a thin film of lubricant between the shell and the lining for damping noise generated by the motor.

U.S. Pat. No. 4,982,812 to Hwang discloses a noise-preventive apparatus for a compressor including a double-wall vacuum jacket encompassing a compressor therein so that the noise generated during operation of the compressor will not be transmitted outwardly through a vacuum chamber, thereby preventing noise pollution.

U.S. Pat. No. 5,804,775 to Pinnington discloses an acoustic enclosure for the reduction of noise transmission from monopole, quadrapole and higher order noise sources. The enclosure has an approximately spherical shaped outer wall, which is made from stiff materials to reduce the amount of stretching of the enclosure wall. The enclosure substantially encases the noise source.

Although the above-identified patents disclose enclosures for damping the level of noise transmitted by motor, engine or machine, there remains a need for an enclosure for a portable machine capable of effectively attenuating noise. In particular there is a need for a sound attenuating enclosure for a portable compressor.

Portable air compressor systems generally include an air compressor mounted upon a trailer and having a protective enclosure or cover secured over the top of the compressor, such as the portable compressor disclosed in commonly assigned U.S. Pat. No. 5,518,262, the disclosure of which is hereby incorporated by reference herein.

SUMMARY OF THE INVENTION

In accordance with certain preferred embodiments of the present invention, a sound attenuating enclosure for a portable machine includes a lower body having an inner skin and an outer skin spaced apart from the inner skin. The lower body is adapted for having the portable machine mounted therein and also includes one or more wheels rotatably mounted thereto. The sound attenuating enclosure also includes an upper body overlying the lower body for containing the portable machine between the upper and lower bodies, and a towing element attached to the lower body for pulling the enclosure over a surface. The enclosure is designed so that one or more sections of the inner and outer skins are in permanent contact with one another for damping vibrational movement of the skins during operation of the machine so as to reduce the level of sound emanating from the enclosure.

In certain preferred embodiments, the one or more sections of the inner and outer skins in permanent contact with one another are molded together so as to form one or more integrated supports. The one or more integrated supports are molded together using a rotational molding process. Each integrated support preferably includes a projection formed in the outer skin and extending toward the inner skin, each projection having an apex in contact with the inner skin. Each projection may also include a conical-shaped portion.

The towing element may include a tow bar connected to the lower body and projecting from a front end thereof. The tow bar is preferably adjustable for modifying the height of the front end of the lower body above the surface. In certain embodiments, the upper body has a different coefficient of thermal expansion than the lower body. The enclosure including the portable machine generally has an overall weight of approximately 375–425 kilograms.

The enclosure is preferably designed to muffle and/or minimize the amount of noise transmitted from the enclosure. To this end, the upper and lower bodies preferably comprise polymer materials that are relatively poor deflectors of noise so as to minimize the amount of noise emanating from the enclosure during operation of the portable machine. Desirably, the lower body includes materials selected from the group consisting of polyolafins and nylon and the upper body includes acrylonitrile butadiene styrene (ABS). The upper body may also include polycarbonate and/or polyolafins. The upper and lower bodies may be formed using a molding process, such as a vacuum molding process. In preferred embodiments, the upper body may have a different coefficient of thermal expansion than the lower body.

The portable machine is preferably secured within the interior region of the lower body and covered by the upper body, the upper and lower body essentially encasing the machine. There are preferably no gaps between the upper body and the lower body, thereby eliminating passageways through which the noise may escape. The upper body is preferably secured to the lower body, and is more preferably hingedly secured to the lower body so that the upper body is movable with respect to the lower body for selectively accessing the portable machine.

The upper body may be hingedly secured to the lower body. The upper body preferably has at least one bottom edge and the lower body preferably includes an alignment channel integrally molded into an upper portion thereof for receiving the at least one bottom edge of the upper body. When the upper body is closed over the lower body, engagement of the at least one bottom edge of the upper body and the alignment channel of the lower body generally aligns the upper body relative to the lower body. The alignment channel generally provides lateral support for the at least one bottom edge of the lower body for preventing collapse and/or deformation of the upper body.

The use of polymer materials for the enclosure, as opposed to using heavier metal materials, significantly reduces the overall weight of the enclosure. In certain preferred embodiments, the enclosure including the portable machine has an overall weight of approximately 375–425 kilograms. Thus, smaller vehicles than ordinarily required for conventional portable machine trailers may be utilized to tow the relatively lightweight enclosure of the present invention.

Other objects, advantages and features of the present invention will be readily apparent to one skilled in the art from the following detailed description of preferred embodiments when taken in conjunction with the accompanying drawings showing certain preferred embodiments of the present invention.

DETAILED DESCRIPTION OF PREFERRED EMBODIMENTS

Figure 1:
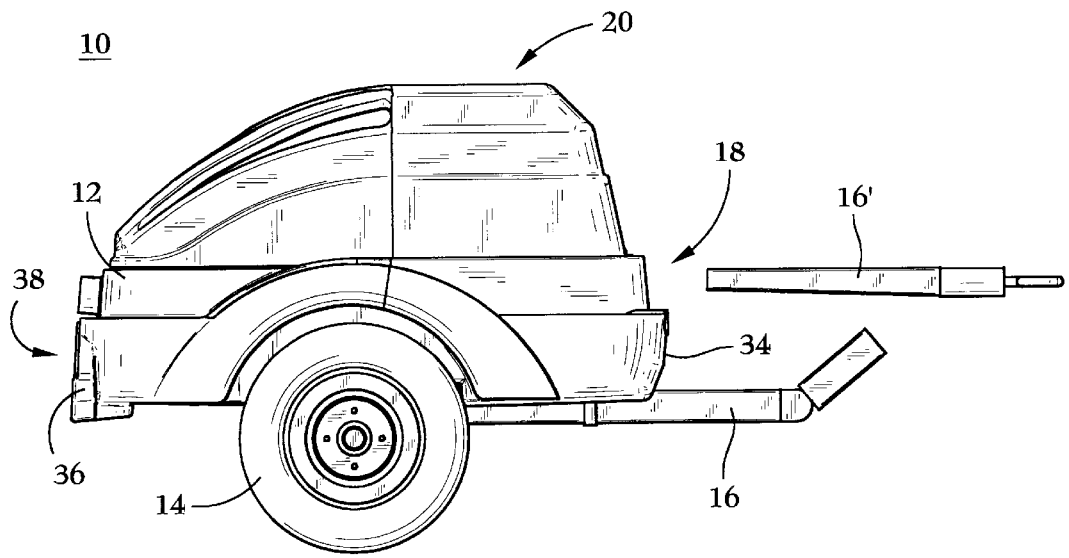
FIG. 1 shows a side view of an enclosure for a portable machine including a lower body, an upper body and a towing element, in accordance with one preferred embodiment of the present invention.

FIGS. 1–6 show various views of a sound attenuating enclosure for a machine in accordance with certain preferred embodiments of the present invention. The sound attenuating enclosure generally comprises a trailer 10 including a lower body portion 12 having wheels 14 rotatably mounted thereto. The lower body portion 12 includes a tow bar 16 secured to the trailer 10 and projecting from a front end 18 thereof for towing the trailer. In other embodiments, the tow bar may include a flat version 16' having a fixed height above the ground or a raised version 16 which is capable of being adjusted so as to modify the height of the tow bar above the ground. The lower body portion 12 preferably comprises a polymer, such as a high-density polyethylene. In other preferred embodiments, the lower body portion 12 may include other moldable materials, such as a medium density polyethylene or nylon. The trailer 10 also includes an upper body 20 that also preferably comprises a polymer material. The upper body 20 may include acrylonitrile butadiene styrene (ABS), a polymer material having a different coefficient of thermal expansion than the lower body 12. The upper body may also include polycarbonate and/or polyolafins. In one preferred embodiment, the upper body 20 is molded using a vacuum molding process. The utilization of polymer materials for the trailer 10 enhances sound attenuation due to the natural ability of polymers to muffle sound. As is well known to those skilled in the art, polymers muffle sounds more efficiently than metals because they have a less dense molecular structure.

Figure 2:
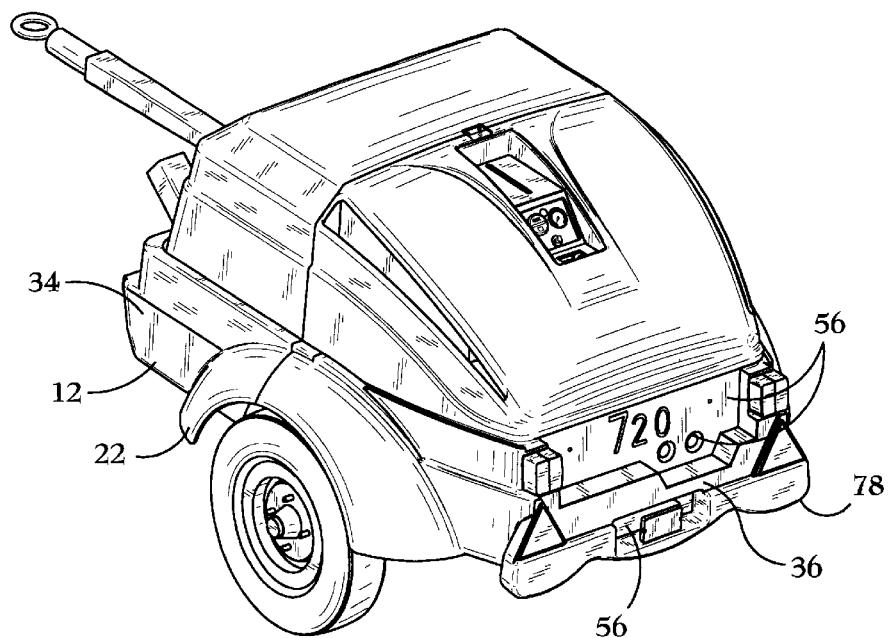
FIG. 2 shows a rear perspective view of the enclosure of FIG. 1.

Referring to FIG. 2, the lower body portion 12 includes a stylized external design having rounded edges, corners and fenders 22. The rounded shape of the lower body 12 portion provides a more aerodynamic structure that has a more aesthetically pleasing look and feel. In addition, the generally rounded design is safer because it is devoid of the sharp edges typically present in metal trailers. As such, the rounded design of the trailer 12 improves the overall performance and safety of the portable trailer.

Figure 3:
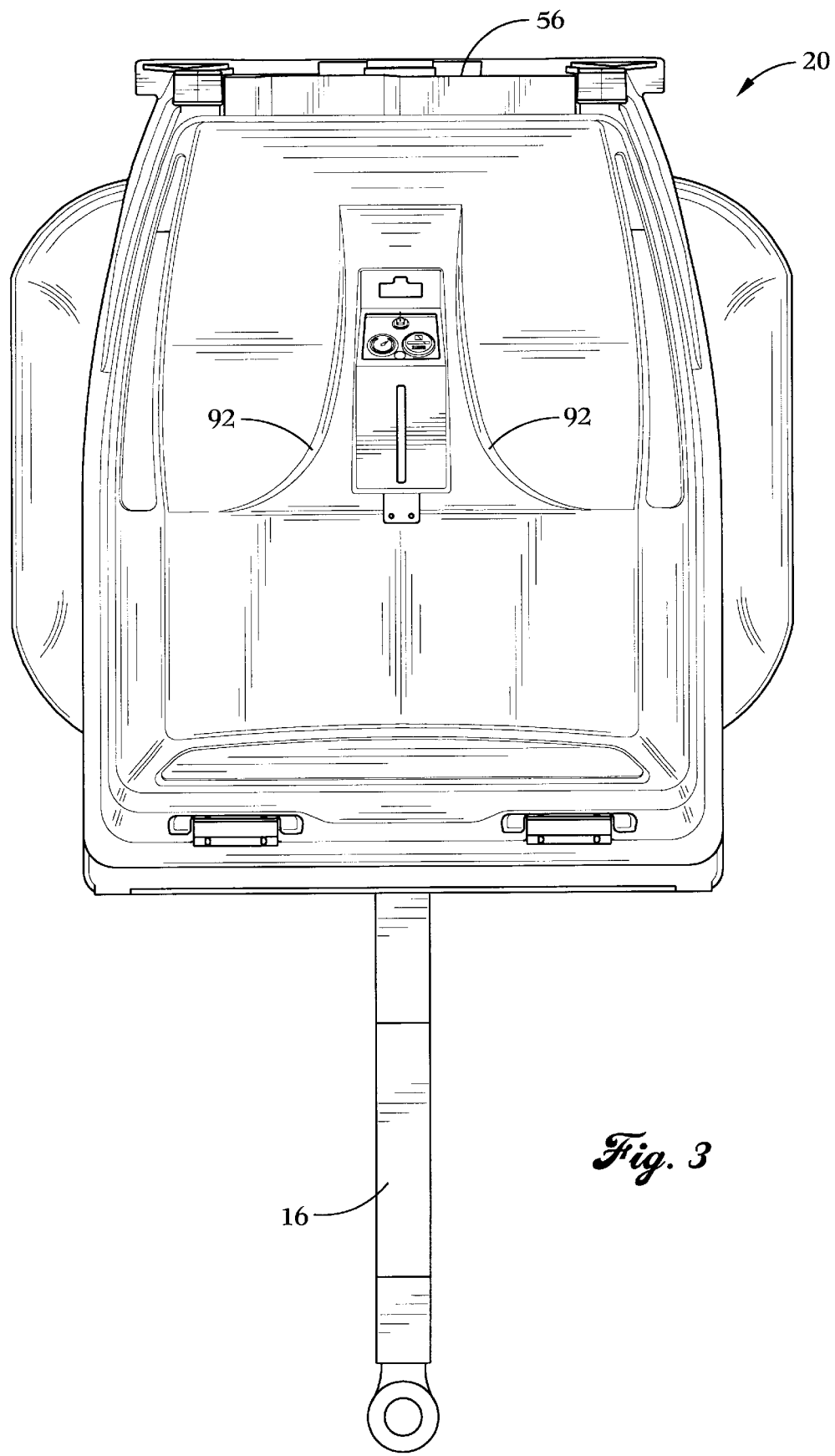
FIG. 3 shows a top view of the enclosure of FIG. 1.

Referring to FIGS. 1–3, the tear drop shape of the trailer generates favorable airflow patterns when the trailer is being towed, thereby enhancing stability. Moreover, the use of polymer materials for the trailer, as opposed to metal, reduces the overall weight of the trailer. In certain preferred embodiments, the trailer comprising polymer materials has an overall weight of between approximately 375–425 kilograms, or about 20% lighter than prior art trailers using metal. As a result, smaller vehicles may be used to tow the lighter weight trailers disclosed herein. In addition, the reduced weight of the trailer allows the trailer to be towed at greater speeds and improves overall stability. Further, the use of polymer materials for the upper and lower bodies provides for better sound attenuation.

Figure 4A:
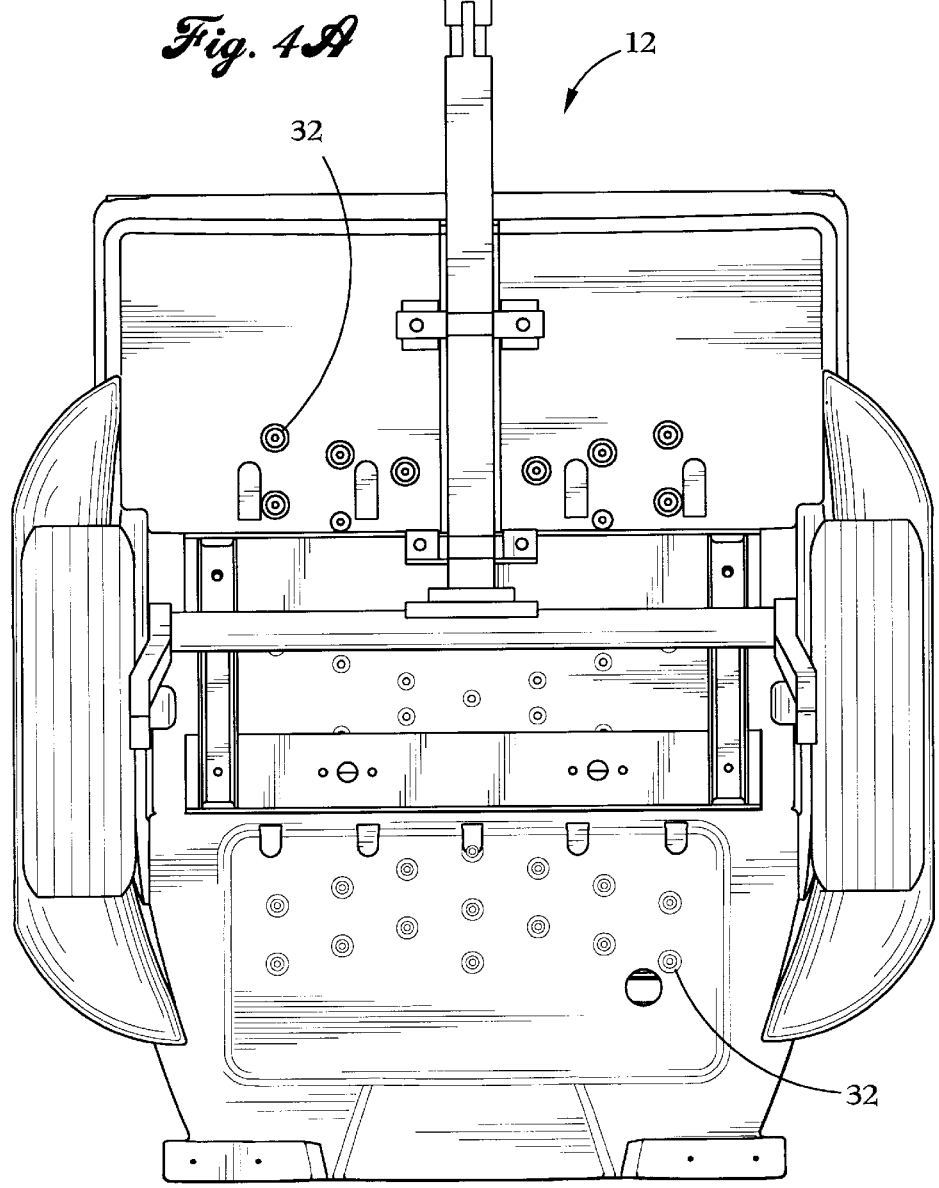
FIG. 4A shows a bottom view of the enclosure of FIG. 1.
Figure 4B:
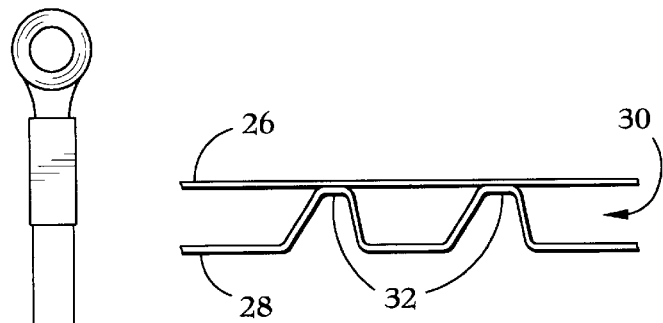
FIG. 4B shows a fragmentary cross sectional view of the lower body including an inner skin, an outer skin, and an air gap between the inner and outer skins for muffling sound generated during operation of the portable machine, in accordance with certain preferred embodiments of the present invention.
Figure 5:
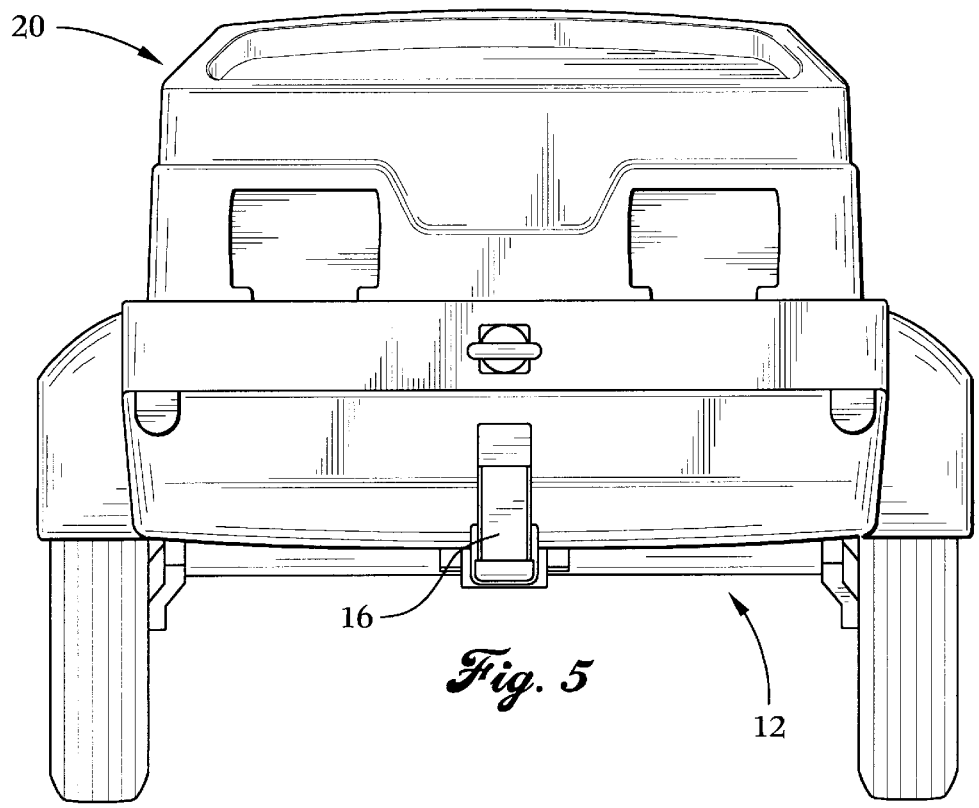
FIG. 5 shows a front view of the enclosure of FIG. 1.
Figure 6:
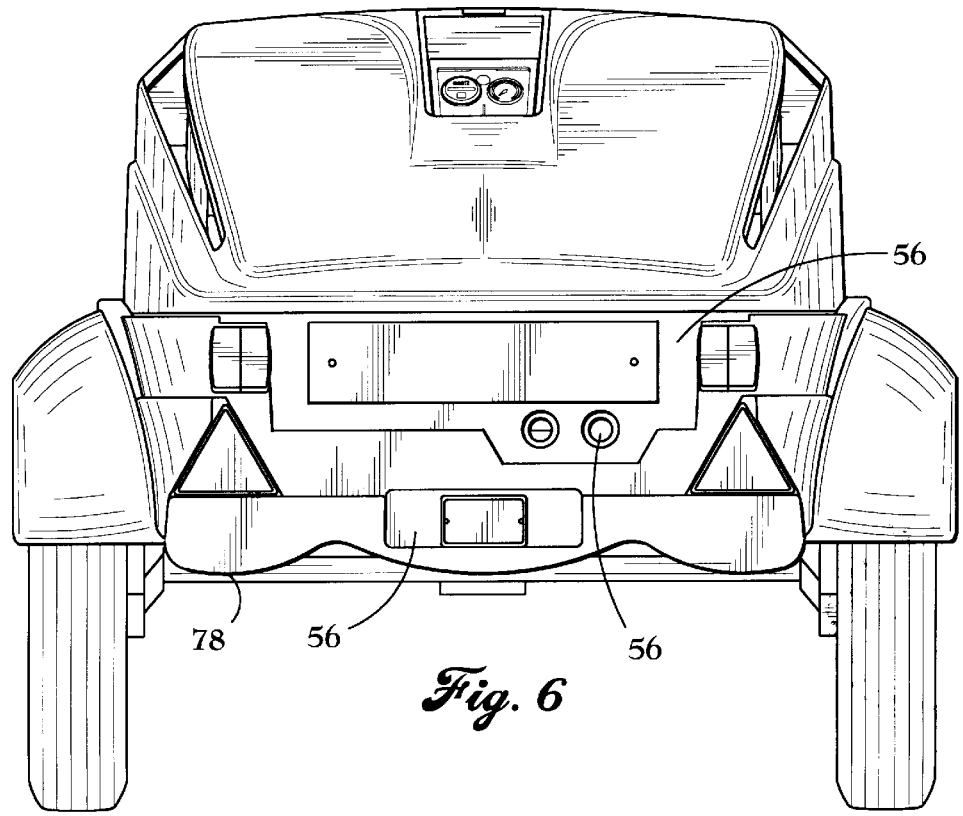
FIG. 6 shows a rear view of the enclosure of FIG. 1.

Referring to FIGS. 4A and 4B, the lower body portion 12 includes an inner skin 26 and an outer skin 28. The space 30 between the inner and outer skins 26 and 28 is preferably filled by air, also referred to as an air gap, which generally muffles and/or attenuates the sounds produced by the air compressor and the engine. The air gap is preferably between approximately 30–90 mm and, in one particular embodiment, is more preferably between about 30–40 mm. In other preferred embodiments, the air gap may be filled by insulating material such as foam, rubber, or any commonly used insulation materials. In certain preferred embodiments, selected portions of the inner and outer skins are in permanent contact with one another so as to minimize unwanted movement and vibration of the skins. These selected sections of the inner and outer skins 26 and 28 are preferably molded together to provide integrated supports 32. A rotational molding process may accomplish this. During the rotational molding process, selected portions of the outer skin 28 are forced in an upward direction toward the inner skin 26 so that the outer skins are shaped as conical portions and secured to the inner skin to provide the integrated supports 32. The integrated supports 32 enhance the structural integrity of the design by damping vibrational movement of the inner and outer skins of the lower body portion.

Figure 7:
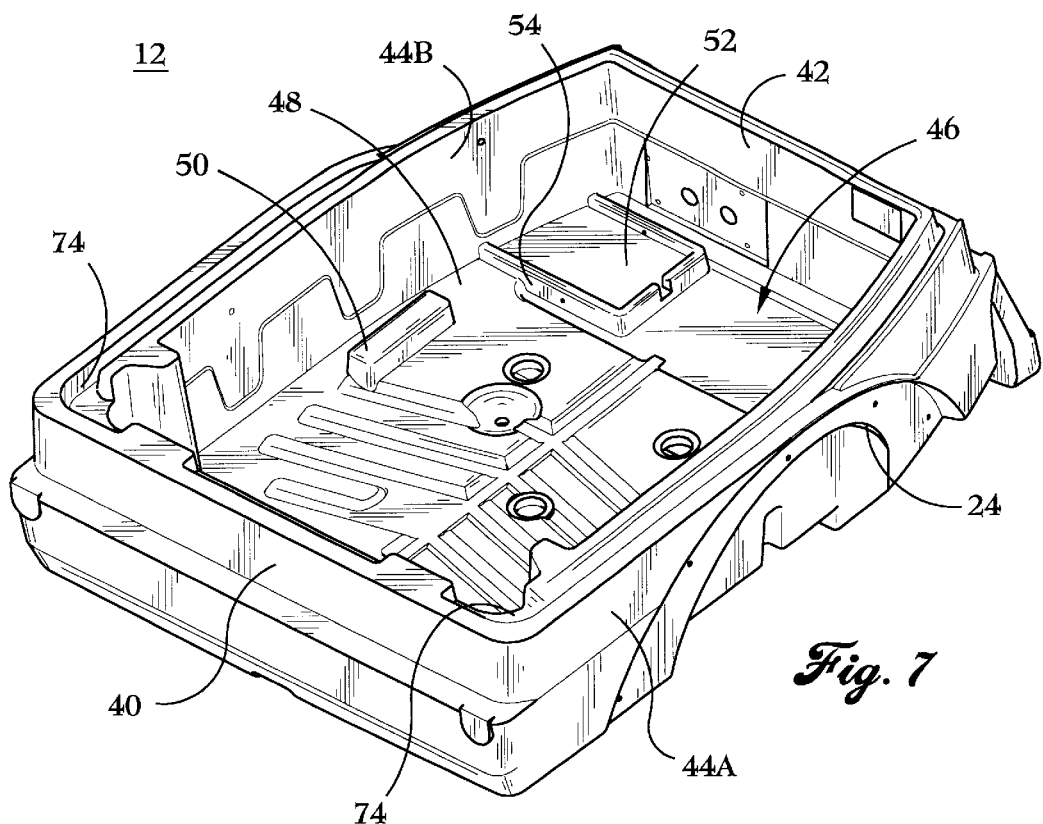
FIG. 7 shows a perspective top view of the lower body of FIG. 1, in accordance with certain preferred embodiments of the present invention.

Referring to FIG. 7, the lower body includes four side walls designated front wall 40, rear wall 42, and sides walls 44A and 44B, which define an interior region 46 thereof adapted for securing, inter alia, an air compressor, an engine and a battery. In one particular embodiment, the floor 48 of the interior region 46 includes a projection or key 50 integrally molded therein which is sized and shaped to fit within a recess formed in the bottom of a fuel tank (not shown). Preferably, the outer dimensions of the projection 50 substantially match the inside dimensions of the recess in the fuel tank so that the fuel tank fits snugly over the projection 50. The projection 50 on the floor 48 of the lower body 12 and the recess in the fuel tank cooperatively secure the fuel tank from moving in lateral directions, i.e. along the X and Y axes. A securing element, such as a retaining strap, may be placed over the fuel tank and secured to the lower body 12 for preventing the fuel tank from moving along the Z-axis.

Referring to FIG. 7, the lower body also has a battery mounting area 52 molded into the floor 48 thereof. The battery mounting area 52 includes a low wall 54 that surrounds the mounting area. The low wall 54 surrounds the battery (not shown) and prevents the battery from moving in lateral directions. Although the fuel tank, the air compressor, the battery and other components may be in direct contact with the floor 48 of the lower body 12, the polymer materials of the lower body will not deform during operation of the air compressor because the maximum operating temperature of the components is less than the melting temperature of the polymer materials.

Referring to FIG. 7, the lower body 12 also includes an alignment channel 74 molded into a top portion of the front wall 40 and the sides walls 44A and 44B for receiving one or more bottom edges of the upper body 20. The engagement of the upper body 20 and the alignment channel 74 serves to align the upper body 20 with the lower body 12 during opening and closing of the trailer 10. The alignment channel 74 also enhances the structural integrity of the trailer by providing lateral support for the bottom edges of the upper body 20 so as to prevent the collapse and/or deformation of the upper body 20. The channel 74 preferably has sufficient width to capture the bottom edge of the upper body 20 at a wide range of operating temperature, thus providing for misalignment tolerances between the upper and lower body components. This alignment feature is particularly important in view of the fact that the upper and lower bodies may comprise different materials having different coefficients of thermal expansion.

Figure 8:
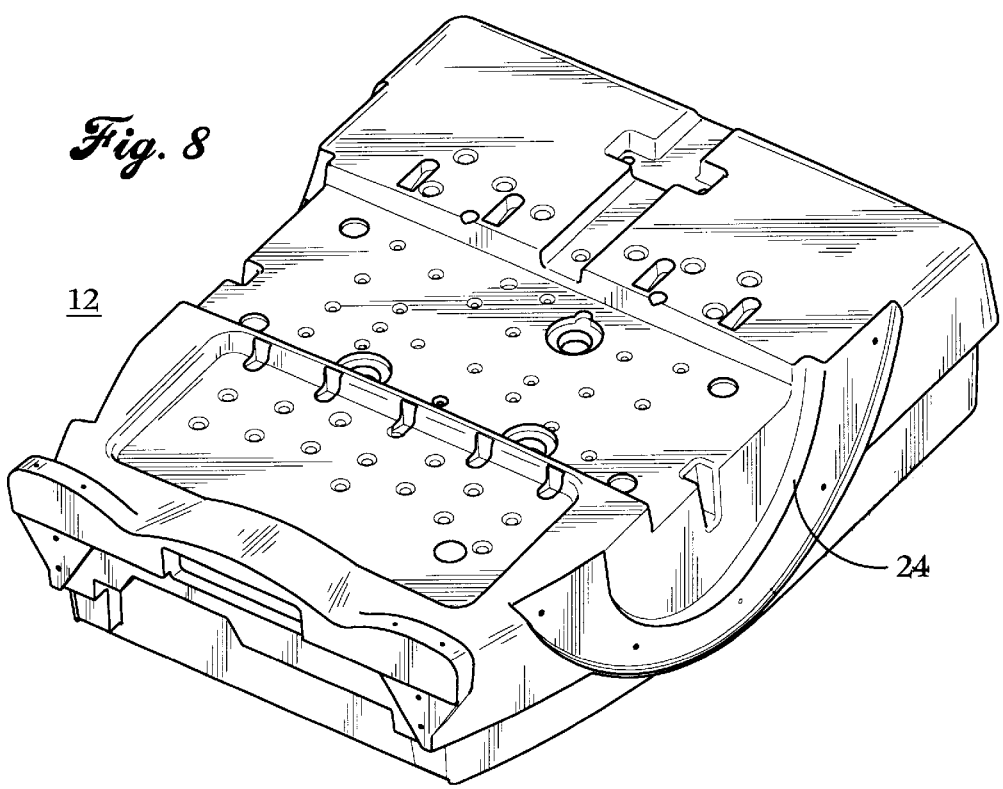
FIG. 8 shows a perspective bottom view of the lower body of FIG. 7.

FIG. 8 shows the lower body 12 after tow bar 16 (FIG. 1) has been disconnected therefrom. FIG. 8 also shows the plurality of integrated supports 32 connecting portions of the outer skin 28 of the lower body 12 to the inner skin 26 of the lower body 12.

It will therefore be readily understood by those skilled in the art that the present invention may be used for a broad array of functions and applications and that many embodiments and adaptations of the present invention, other than those described herein, will be apparent from or reasonably suggested by the foregoing description without departing from the substance or scope of the present invention. For example, the enclosure disclosed herein may be utilized for portable light towers, portable generators or portable compressors. Accordingly, while the present invention has been described in relation to its preferred embodiment, it is to be understood that this disclosure is only illustrative and exemplary of the present invention and is made merely for purposes of providing a full and enabling disclosure. The foregoing is not intended or to be construed to limit the present invention or otherwise to exclude any such other embodiments, adaptations, variations, modifications and equivalent arrangements.

What is claimed is:

1. A sound attenuating enclosure for a portable machine comprising:
    a lower body having a lower body coefficient of thermal expansion, the lower body including an inner skin and an outer skin spaced apart from said inner skin, said lower body being adapted for having said portable machine mounted therein, said lower body having one or more wheels rotatably mounted thereto;
    an upper body having an upper body coefficient of thermal expansion, the upper body overlying said lower body for containing said portable machine between said upper and lower bodies, wherein said upper body has a different coefficient of thermal expansion than said lower body; and
    a towing element attached to said lower body for pulling said enclosure over a surface, wherein said towing element includes a tow bar connected to the lower body and projecting from a front end thereof and the tow bar is adjustable for modifying the height of the front end of the lower body above said surface;
    wherein one or more sections of said inner and outer skins are in permanent contact with one another for damping vibrational movement of said skins during operation of said machine so as to reduce the level of sound emanating from said enclosure.

2. The sound attenuating enclosure as claimed in claim 1, wherein the one or more sections of said inner and outer skins in permanent contact with one another are molded together so as to form one or more integrated supports.

3. The sound attenuating enclosure as claimed in claim 2, wherein said one or more integrated supports are molded together using a rotational molding process.

4. The sound attenuating enclosure as claimed in claim 2, wherein each said integrated support includes a projection formed in the outer skin and extending toward said inner skin, said projection including an apex in contact with said inner skin.

5. The sound attenuating enclosure as claimed in claim 4, wherein said projection includes a conical-shaped portion.

6. The sound attenuating enclosure as claimed in claim 1, wherein said lower body including said inner and outer skins thereof comprise materials selected from the group consisting of polyolafins and nylon.

7. The sound attenuating enclosure as claimed in claim 1, wherein said upper body includes a material selected from the group consisting of acrylonitrile butadiene styrene (ABS), polycarbonate and polyolafins.

8. The sound attenuating enclosure as claimed in claim 1, wherein said upper and lower bodies are formed using a molding process.

9. The sound attenuating enclosure as claimed in claim 8, wherein said upper body is molded using a vacuum molding process.

10. The sound attenuating enclosure as claimed in claim 1, wherein said upper body is secured to said lower body.

11. The sound attenuating enclosure as claimed in claim 10, wherein said upper body is hingedly secured to said lower body.

12. The sound attenuating enclosure as claimed in claim 1, wherein said upper body has at least one bottom edge and said lower body includes an alignment channel integrally molded into an upper portion thereof for receiving said at least one bottom edge.

13. The sound attenuating enclosure as claimed in claim 12, wherein engagement of said at least one bottom edge of said upper body and the alignment channel of said lower body generally aligns said upper body relative to said lower body.

14. The sound attenuating enclosure as claimed in claim 13, wherein said alignment channel provides lateral support for said at least one bottom edge of said lower body for preventing collapse and/or deformation of the upper body.

15. The sound attenuating enclosure as claimed in claim 1, wherein said enclosure including said portable machine has an overall weight of approximately 375–425 kilograms.

16. A sound attenuating enclosure for a portable machine comprising:

a lower body having a lower body coefficient of thermal expansion, the lower body including an inner skin and an outer skin spaced apart from said inner skin, said lower body being adapted for having said portable machine mounted therein, said lower body having one or more wheels rotatably mounted thereto;

an upper body having an upper body coefficient of thermal expansion, the upper body overlying said lower body for containing said portable machine between said upper and lower bodies, wherein said upper body has a different coefficient of thermal expansion than said lower body; and a towing element attached to said lower body for pulling said enclosure over a surface;

wherein one or more sections of said inner and outer skins are in permanent contact with one another for damping vibrational movement of said skins during operation of said machine so as to reduce the level of sound emanating from said enclosure.

17. The sound attenuating enclosure as claimed in claim 16, wherein said lower body including said inner and outer skins thereof comprise materials selected from the group consisting of polyolafins and nylon.

18. The sound attenuating enclosure as claimed in claim 16, wherein said upper body includes a material selected from the group consisting of acrylonitrile butadiene styrene (ABS), polycarbonate and polyolafins.

* * * * *